(12) United States Patent
Cartwright

(10) Patent No.: US 6,354,626 B1
(45) Date of Patent: Mar. 12, 2002

(54) LOCKING MECHANISM FOR TELESCOPING STEERING COLUMN

(75) Inventor: Mark A. Cartwright, West Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/634,383

(22) Filed: Aug. 9, 2000

(51) Int. Cl.$^7$ .................................................. B62D 1/18
(52) U.S. Cl. ........................ 280/777; 280/775; 74/493
(58) Field of Search ................................ 280/777, 775; 74/493; 403/359.1

(56) References Cited

U.S. PATENT DOCUMENTS

| | | | | |
|---|---|---|---|---|
| 4,516,440 A | * | 5/1985 | Nishikawa | 74/493 |
| 4,674,354 A | * | 6/1987 | Brand | 74/492 |
| 4,833,936 A | * | 5/1989 | Mariani et al. | 74/493 |
| 5,071,163 A | * | 12/1991 | Heinrichs et al. | 280/775 |
| 5,332,260 A | * | 7/1994 | Heinrichs et al. | 280/775 |
| 5,476,284 A | * | 12/1995 | DuRocher et al. | 280/777 |
| 5,640,884 A | * | 6/1997 | Fujiu et al. | 74/492 |
| 6,099,036 A | * | 8/2000 | Fujiu et al. | 280/777 |
| 6,216,552 B1 | * | 4/2001 | Friedewald et al. | 74/493 |

* cited by examiner

Primary Examiner—Paul N. Dickson
Assistant Examiner—Deanna Draper
(74) Attorney, Agent, or Firm—Tarolli, Sundheim, Covell, Tummino & Szabo L.L.P.

(57) ABSTRACT

An apparatus for supporting a steering wheel (16) of a vehicle (14) comprises a first steering column part (70) and a second steering column part (80). The first steering column part (70) and the vehicle steering wheel (16) are supported for telescopic movement along an axis (28) between a plurality of different positions relative to the second steering column part (80). A locking mechanism (10) is interposed between the first steering column part (70) and the second steering column part (80) for locking the first steering column part in a selected one of the plurality of positions. The locking mechanism (10) comprises a fluid (100) having a viscosity which varies in response to an energy field acting on the fluid. The locking mechanism (10) also includes means (108) for varying the viscosity of the fluid (100) by varying the energy field to vary the resistance to movement of the first steering column part (70) relative to the second steering column part (80).

11 Claims, 2 Drawing Sheets

LOCKING MECHANISM FOR TELESCOPING STEERING COLUMN

BACKGROUND OF THE INVENTION

1. Technical Field

The present invention relates to a locking mechanism for a telescoping steering column.

2. Description of the Prior Art

A known telescoping steering column for a vehicle includes two relatively movable sections of the steering column. The vehicle steering wheel is supported on one of the movable sections. To adjust the steering column, the driver of the vehicle moves a handle to release the one section for telescopic movement relative to the other section. When the steering wheel is in the desired position, the driver releases the handle, and a mechanical locking mechanism within the steering column prevents further relative movement of the steering column sections.

The two steering column sections often have a splined connection between them. A small gap exists between the two splined parts. As a result, some amount of lash is present in the steering column, adversely affecting the steering feel and control.

It is known to use electrorheological fluid in an energy absorber for an engine mount or another structure having two relatively movable parts. Typical structures incorporating such a fluid are disclosed in U.S. Pat. Nos. 5,176,368 and 5,655,757. Varying the strength of an energy field acting on the fluid can vary the apparent viscosity of the fluid, thus controlling the energy absorption characteristics of the device.

SUMMARY OF THE INVENTION

The present invention is an apparatus for supporting a steering wheel of a vehicle. The apparatus comprises a first steering column part and a second steering column part. The first steering column part and the vehicle steering wheel are supported for telescopic movement along an axis between a plurality of different positions relative to the second steering column part. A locking mechanism is interposed between the first steering column part and the second steering column part for locking the first steering column part in a selected one of the plurality of positions. The locking mechanism comprises a fluid having a viscosity which varies in response to an energy field acting on the fluid. The locking mechanism also includes means for varying the viscosity of the fluid by varying the energy field to vary the resistance to movement of the first steering column part relative to the second steering column part.

BRIEF DESCRIPTION OF THE DRAWINGS

Further features of the present invention will become apparent to those skilled in the art to which the present invention relates from reading the following specification with reference to the accompanying drawings, in which:

FIG. 3 is a sectional view taken along line 3—3 of FIG. 1.

DETAILED DESCRIPTION OF AN EMBODIMENT OF THE INVENTION

Figure 1:
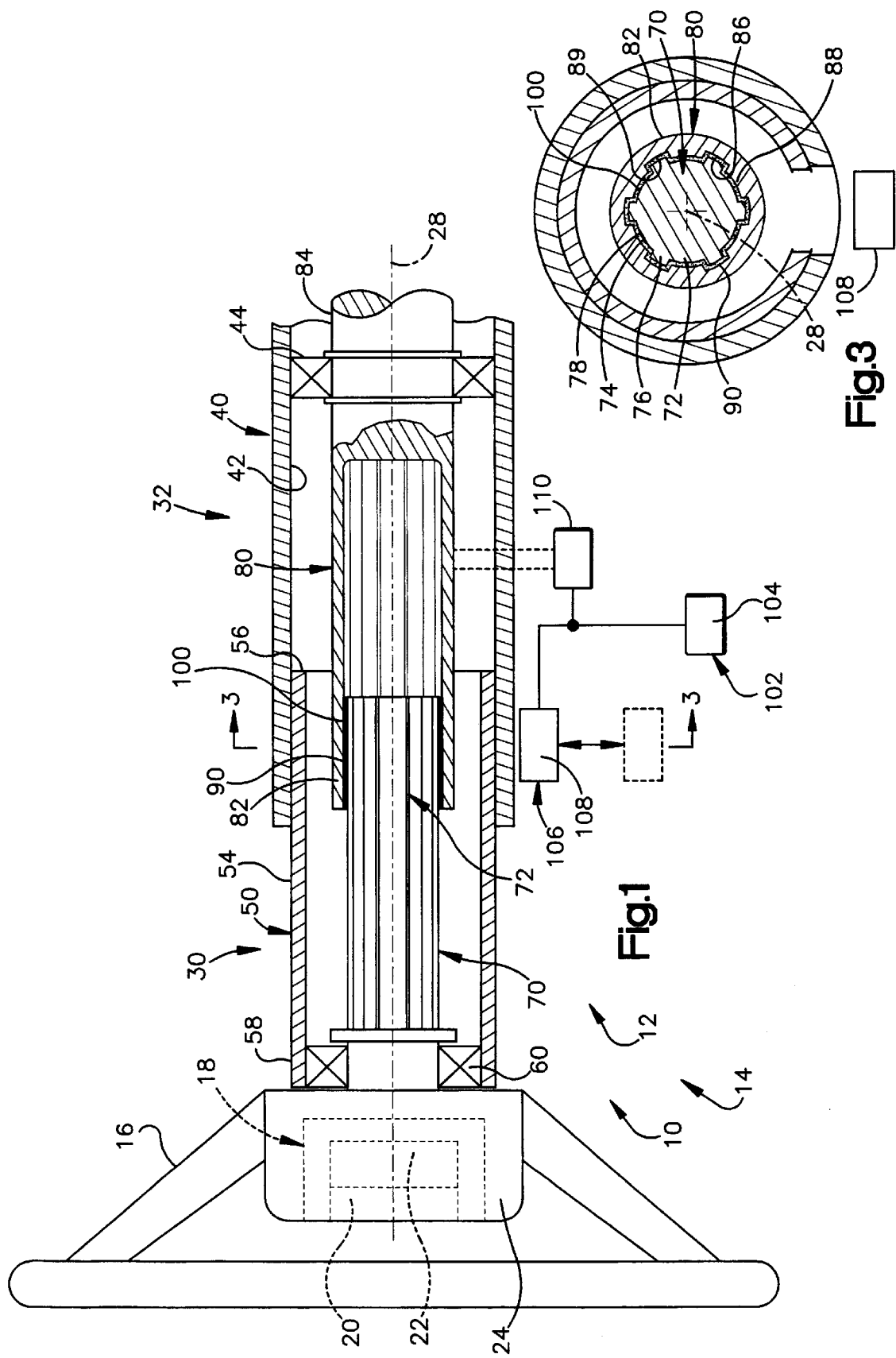
FIG. 1 is a schematic illustration of an apparatus constructed in accordance with the present invention.
Figure 2:
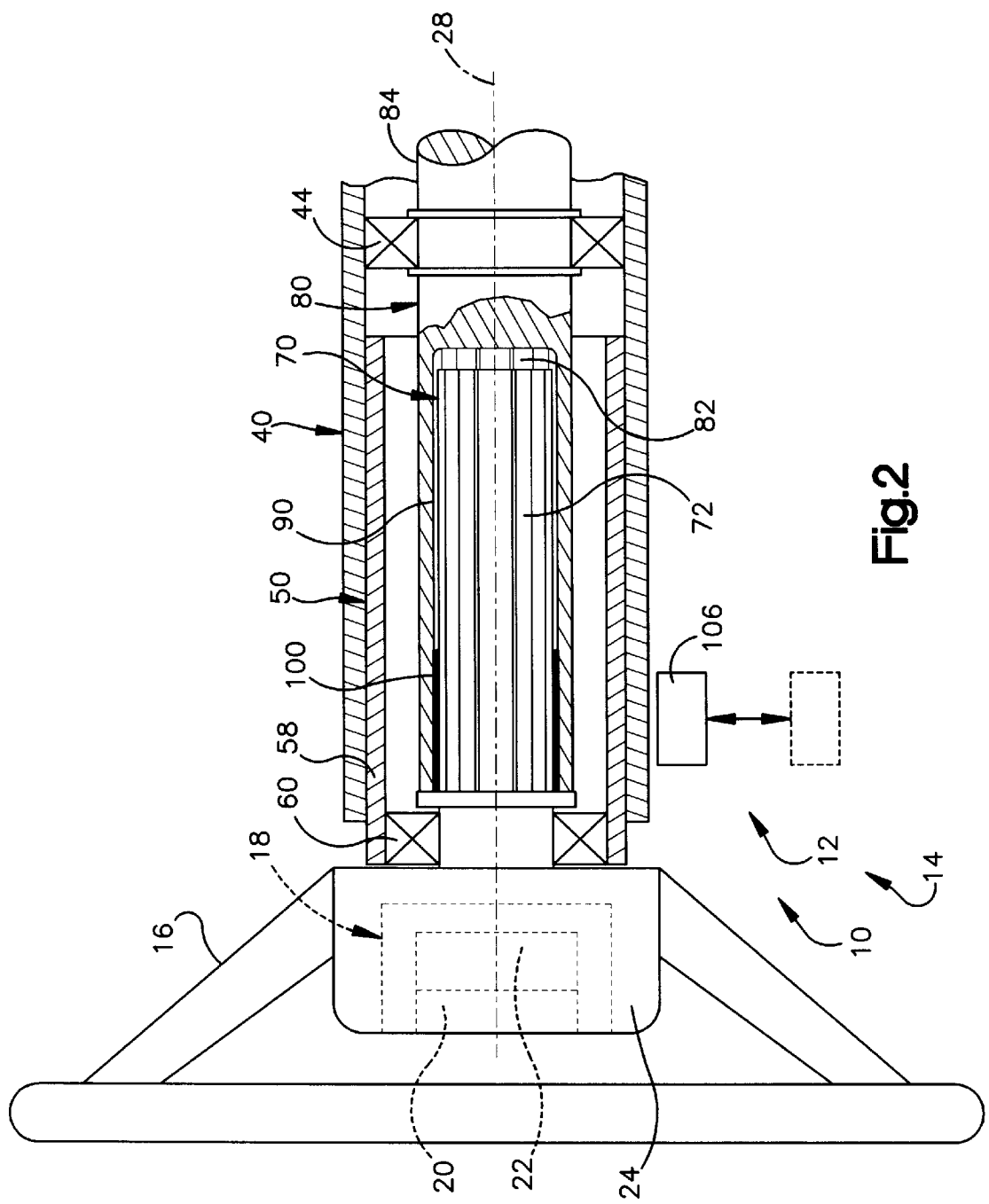
FIG. 2 is an enlarged sectional view of a portion of the apparatus of FIG. 1.

The present invention relates to a locking mechanism for a telescoping steering column. The present invention is applicable to various locking mechanism constructions. As representative of the present invention, FIG. 1 illustrates schematically a locking mechanism 10, constructed in accordance with the invention, for a telescoping steering column 12 of a vehicle 14.

The vehicle 14 includes a steering wheel 16 for effecting directional control of the vehicle. An air bag module 18 is mounted on the steering wheel 16. The air bag module 18 includes an air bag 20 and an inflator 22 within a cover 24. The cover 24 is adapted to open easily upon inflation of the air bag 20.

The steering wheel 16 is supported on the steering column 12 of the vehicle 10 for rotation about an axis 28. The steering column 12 includes an axially movable, or first, steering column part 30 and an axially stationary, or second, steering column part 32. The first steering column part 30 is selectively axially movable relative to the second steering column part 32. Such axial motion in a steering column is commonly referred to as "telescoping" motion, and enables the position of the steering wheel 16 to be adjusted to fit the particular driver of the vehicle 14.

The steering column 12 includes a housing, a portion of which is shown schematically at 40. The housing 40 is fixed to the vehicle structure. The housing 40 is thus part of the axially stationary steering column part 32. The housing 40 has a tubular configuration centered on the axis 28. The housing 40 has a cylindrical inner surface 42. The housing 40 supports a bearing 44.

The steering column 12 includes a sleeve 50. The sleeve 50 has a tubular, cylindrical configuration including a cylindrical outer side surface 54 centered on the axis 28. The sleeve 50 has an inner end portion 56 and an opposite outer end portion 58. The outer end portion 58 of the sleeve 50 projects from the housing 40. The outer end portion 58 of the sleeve 50 supports a bearing 60.

The outer surface 54 of the sleeve 50 is in sliding engagement with the inner surface 42 of the housing 40. The sleeve 50 is thus supported in the housing 40 for axial sliding movement relative to the housing. The sleeve 50 is thus part of the axially movable first steering column part 30. The sleeve 50 does not, however, rotate relative to (within) the housing 40.

The steering column 12 includes two parts that rotate together, as a group, in response to turning of the steering wheel 16, to effect steering movement of the vehicle 14. The two parts of the rotating group include a first steering shaft part 70 and a second steering shaft part 80.

The first steering shaft part 70 supports the steering wheel 16 directly and extends from the steering wheel in a direction away from the driver of the vehicle 14. The first steering shaft part 70 is fixed for movement with the steering wheel 16, both rotationally and axially. The first steering shaft part 70 is thus part of the axially movable steering column part 30, together with the sleeve 50.

The first steering shaft part 70 has a cylindrical configuration and extends through the bearing 60 in the outer end portion 58 of the sleeve 50. The bearing 60 supports the first steering shaft part 70 for rotation relative to the sleeve 50 about the axis 28.

The first steering shaft part 70 has an inner end portion 72. The inner end portion 72 has an externally splined configuration as best seen in FIG. 3. Thus, the outer surface 74 of the first steering shaft part 70 includes an array of axially extending, radially outwardly projecting splines 76 separated circumferentially by grooves 78.

The second steering shaft part 80 is fixed in position axially in the vehicle 14. The second steering shaft part 80 is thus part of the axially stationary steering column part 32, together with the housing 40. The second steering shaft part 80 has an outer end portion 82 and an inner end portion 84.

The inner end portion 84 of the second steering shaft part extends through the bearing 44 and is connected with vehicle steering linkage (not shown). The second steering shaft part 80 is supported for rotation relative to, and within, the housing 40. The second steering shaft part 80 is disposed radially inward of the sleeve 50 and is thus rotatable within the sleeve.

The outer end portion 82 of the second steering shaft part 80 has an internally splined configuration as best seen in FIG. 3. Thus, the inner surface 86 of the second steering shaft part includes an array of axially extending, radially inwardly projecting splines 88 separated circumferentially by grooves 89.

The externally splined inner end portion 72 of the first steering shaft part 70 is received in the internally splined outer end portion 82 of the second steering shaft part 80. The splines 88 of the second part 80 are received in the grooves 78 of the first part 70. The splines 76 of the first part 70 are received in the grooves 89 of the second part 80.

The splined engagement of the first and second steering shaft parts 70 and 80 fixes the second steering shaft part for rotation with the first steering shaft part. The two parts 70 and 80 are thus rotatable together as a group about the axis 28, in the bearings 44 and 60, relative to the sleeve 50 and the housing 40. Thus, upon rotation of the vehicle steering wheel 16 by the driver, the first steering shaft part 70 rotates and thereby rotates the second steering shaft part 80. The rotation of the second steering shaft part 80 is transmitted through steering linkage (not shown) to effect steering movement of the vehicle 14.

The splined engagement of the first and second steering shaft parts 70 and 80 permits telescoping movement of the first steering shaft part 70, as described below. There is, however, a small amount of clearance, that is, a gap 90, between the splined inner end portion 72 of the first steering shaft part 70 and the splined outer end portion 82 of the second steering shaft part 80. The existence of this gap 90 means there is a small amount of circumferential lash between the parts 70 and 80 of the rotating group.

The locking mechanism 10 includes a fluid 100. The fluid 100 is a lubricating fluid whose viscosity can be varied by applying an energy field to the fluid. The fluid 100 is preferably an electrorheological magnetic fluid whose viscosity can be varied by controlling the strength of a magnetic field applied to the fluid.

The fluid 100 is disposed in and fills the gap 90. Because the fluid 100 fills the gap 90, the splined outer surface 74 of the inner end portion 72 of the first steering column part 70 is covered by the fluid. Also, the splined inner surface 86 of the outer end portion 84 of the second steering column part 80 is covered by the fluid 100.

The viscosity of the fluid 100 controls or affects relative axial movement of the first and second steering shaft parts 70 and 80. Specifically, relatively high viscosity of the fluid 100 limits axial sliding movement of the first steering shaft part 70 relative to, and within, the second steering shaft part 80. Conversely, relatively low viscosity of the fluid 100 enables increased axial sliding movement of the first steering shaft part 70 relative to, and within, the second steering shaft part 80. The viscosity of the fluid 100 can be varied, as described below, to vary the resistance to relative rotation between the steering shaft parts 70 and 80.

In addition to the fluid 100, the locking mechanism 10 also includes a release lever shown schematically at 102.

The release lever 102 is supported on the vehicle 14 for movement between a locked position shown in solid lines in FIG. 1 and a released position shown in dashed lines in FIG. 1. The release lever 102 has a portion 104 which is manually engageable by the driver of the vehicle 14 to effect adjustment of the release lever.

The locking mechanism 10 further includes a magnet assembly 106 located on the release lever 102. The magnet assembly 106 includes at least one permanent magnet. In the illustrated embodiment, the magnet assembly 106 includes a permanent magnet shown schematically at 108.

When the release lever 102 is in the released position, the magnet 108 is spaced apart from the fluid 100 in the gap 90 by a first distance. The first distance is great enough that the magnetic field of the magnet 108 does not have a significant effect on the viscosity of the fluid 100 in the gap 90.

When the release lever 102 is in the locked position, the magnet 108 is spaced apart from the fluid 100 in the gap 90 by a second distance, less than the first distance. The second distance is small enough that the magnetic field of the magnet 108 has a significant effect on the viscosity of the fluid 100 in the gap 90. That is, the magnet 108 is close enough to the rotating parts 70 and 80 of the steering column 12 to have the desired effect on the viscosity of the fluid 100.

The locking mechanism 10 also includes a mechanical locking assembly indicated schematically at 110. The mechanical locking assembly 10 is a known assembly for mechanically (that is, without the use of the fluid 100) locking the steering column 12 in a particular telescoped position. The mechanical locking assembly 110 is activated into a locked condition whenever the release lever 102 is in the locked position, and into a released condition whenever the release lever is in the released position.

To adjust the axial (telescoped) position of the steering wheel 16, the vehicle driver engages the manually engageable portion 104 of the release lever 102. The release lever 102 is moved from the locked position to the released position. The mechanical locking assembly 110 is released. The permanent magnet 108 is moved away from the fluid 100 in the gap 90. The strength of the magnetic field applied to the fluid 100 decreases. As the strength of the magnetic field decreases, the viscosity of the fluid 100 decreases accordingly, and the resistance to sliding movement of the first steering shaft part 70 in the second steering shaft part 80 decreases accordingly. As a result, the driver is able to adjust the telescoped position of the steering wheel 16 relative to the housing 40.

When the driver has placed the steering wheel 16 in the desired telescoped position, the driver moves the release lever 102 back to the locked position. As this movement occurs, the mechanical locking assembly 110 is engaged. Also, the permanent magnet 108 is moved back to its initial position adjacent to the fluid 100 in the gap 90 in the rotating group 70 and 80. The strength of the magnetic field applied to the fluid 100 increases. The viscosity of the fluid 100 increases accordingly, and the resistance to sliding movement of the first steering shaft part 70 in the second steering shaft part 80 increases accordingly. As a result, the steering column 12 is locked in the selected position of telescoping movement.

The mechanical locking assembly 110 and the fluid 100 cooperate to control telescoping movement of the steering wheel 16. It is possible that the fluid 100 alone could be used to control telescoping movement of the steering wheel 16. It is also possible that the mechanical locking assembly 110 could be used as the primary axial locking mechanism, with the fluid 100 assisting.

The change in the viscosity of the fluid 100 also controls relative rotational movement of the parts of the rotating group. Specifically, relatively high viscosity of the fluid 100, as occurs when the magnet 108 is near the fluid, limits relative rotation of the first part 70 within the second part 80. This decreases the lash in the steering column 12. Conversely, relatively low viscosity of the fluid 100 enables increased relative rotation of the first part 70 within the second part 80; this occurs only when the steering column 12 is being adjusted for telescoping position.

From the above description of the invention, those skilled in the art will perceive improvements, changes and modifications in the invention. For example, the fluid 100 can, alternatively, be an electrorheological fluid whose viscosity can be varied by controlling the voltage of an electric field applied to the fluid. Such improvements, changes and modifications within the skill of the art are intended to be covered by the appended claims.

Having described the invention, I claim:

1. An apparatus for supporting a steering wheel of a vehicle, said apparatus comprising:

a first steering column part and a second steering column part, said first steering column part and the vehicle steering wheel being supported for telescopic movement along an axis between a plurality of different positions relative to said second steering column part; and a locking mechanism interposed between said first steering column part and said second steering column part for locking said first steering column part in a selected one of said plurality of positions;

said locking mechanism comprising a fluid having a viscosity which varies in response to an energy field acting on said fluid; and means for varying the viscosity of said fluid by varying said energy field to vary the resistance to movement of said first steering column part relative to said second steering column part.

2. An apparatus as set forth in claim 1 wherein said fluid is a magneto-rheological fluid whose viscosity varies in response to a change in magnetic field acting on said fluid, and wherein said means for varying the viscosity of said fluid comprises a magnet for applying said energy field.

3. An apparatus as set forth in claim 2 wherein said locking mechanism includes a manually engageable member movable between a locking condition and a release condition, and wherein said magnet is a permanent magnet which moves relative to said fluid to change the energy field acting on said fluid in response to movement of said manually engageable member between the locking condition and the release condition.

4. An apparatus as set forth in claim 1 wherein said first and second steering column parts are in a sliding telescopic relationship engagement with each other, and said fluid is disposed between said first and second column parts to control sliding movement between them.

5. An apparatus as set forth in claim 1 wherein said first and second steering column parts have interengaging splined portions and said fluid is disposed between said interengaging splined portions of said first and second steering column parts.

6. An apparatus as set forth in claim 5 wherein said fluid is a magneto-rheological fluid whose viscosity varies in response to a change in magnetic field acting on said fluid, and said means for applying an energy field comprises a magnet.

7. An apparatus as set forth in claim 6 wherein said locking mechanism includes a manually engageable member movable between a locking condition and a release condition, and wherein said magnet is a permanent magnet which moves relative to said fluid to change the energy field acting on said fluid in response to movement of said manually engageable member between the locking condition and the release condition.

8. An apparatus for supporting a steering wheel of a vehicle, said apparatus comprising:

a first steering column part and a second steering column part, said first steering column part and the vehicle steering wheel being supported for telescopic movement along an axis between a plurality of different positions relative to said second steering column part, said first steering column part and said second steering column part defining a gap between them;

a fluid having a viscosity which varies in response to an energy field acting on said fluid, said fluid being disposed in said gap; and means for varying the viscosity of said fluid by varying said energy field to vary the resistance to movement of said first steering column part relative to said second steering column part.

9. An apparatus as set forth in claim 8 wherein said first and second steering column parts have interengaging splined portions and said gap is located between said interengaging splined portions of said first and second steering column parts to enable relative rotation between said parts, said fluid resisting relative rotation between said parts.

10. An apparatus as set forth in claim 1 wherein said fluid is a magneto-rheological fluid whose viscosity varies in response to a change in magnetic field acting on said fluid, and wherein said means for varying the viscosity of said fluid comprises a magnet for applying said magnetic field.

11. An apparatus as set forth in claim 10 wherein said locking mechanism includes a manually engageable member movable between a locking condition and a release condition, and wherein said magnet is a permanent magnet which moves relative to said fluid to change the energy field acting on said fluid in response to movement of said manually engageable member between the locking condition and the release condition.

\* \* \* \* \*

UNITED STATES PATENT AND TRADEMARK OFFICE
CERTIFICATE OF CORRECTION

PATENT NO. : 6,354,626 B1
DATED : March 12, 2002
INVENTOR(S) : Mark A. Cartwright It is certified that error appears in the above-identified patent and that said Letters Patent is hereby corrected as shown below:

<u>Column 6,</u>
Line 43, after "claim", change "1" to -- 8 --.

Signed and Sealed this

Seventeenth Day of December, 2002

JAMES E. ROGAN
*Director of the United States Patent and Trademark Office*